Oct. 3, 1961

E. T. HABIB 3,003,127

VELOCITY METER

Filed Feb. 28, 1958

INVENTOR
EDWARD T. HABIB

BY
*B. L. Zangwill*
ATTORNEYS.

Oct. 3, 1961  E. T. HABIB  3,003,127
VELOCITY METER

Filed Feb. 28, 1958  7 Sheets-Sheet 7

INVENTOR
EDWARD T. HABIB

BY
ATTORNEYS.

3,003,127
VELOCITY METER
Edward T. Habib, 8818 Glenville Road,
Silver Spring, Md.
Filed Feb. 28, 1958, Ser. No. 718,379
1 Claim. (Cl. 336—30)
(Granted under Title 35, U.S. Code (1952), sec. 266)

The invention described herein may be manufactured and used by or for the Government of the United States of America for governmental purposes without the payment of any royalties thereon or therefor.

This invention relates to a viscosity controlled velocity meter for measuring shock velocity.

Many of the measuring instruments used to measure transient and vibratory motion are seismograph-type pickups, and can be treated as simple mass-spring systems. A system of this type can be used to measure acceleration, velocity or displacement depending on the frequency range considered. It consists of a frame within which a mass is suspended by a spring. Damping is provided by a viscuous fluid or electromagnetically. Usually, for acceleration and displacement pickups, the electrical output signal is proportional to the relative displacement of the mass with respect to the frame. Most velocity pickups are of the electromagnetic type where the output signal is proportional to the relative velocity of the mass with respect to the frame.

The electromagnetic velocity meter is one of the most important tools in measuring shock motion. The principal advantage in measuring velocity rather than acceleration is the empirical fact that, in a naval shock environment, velocity tends to remain constant with frequency while acceleration increases and displacement decreases directly with frequency.

One result of this is that acceleration records are generally a jumble of high frequency oscillations which totally obscure the low and medium-frequency components. Displacement records are usually confined to low frequencies since the high frequency displacements are obscured.

It is also generally true that these low and medium-frequency components are the ones which cause failures in actual equipment.

The second result is that accelerometers are extremely susceptible to damage since they will respond to these ever present high frequency accelerations. Filtering the output may remove the high frequency from the record but the accelerometer must be rugged enough to withstand them. Also the filter must not overload from these high frequency effects.

The disadvantages of the electromagnetic type velocity meter in measuring the shock motions encountered by naval ships as a result of underwater explosions are:

(1) such meters are large and heavy;
(2) the meter output is highly inaccurate after the magnet collides with the coil.

The primary object of this invention is therefore to disclose a viscosity controlled velocity meter which will accurately measure the medium and low frequency components of the shock motion of structures; particularly the shock motion of naval equipments resulting from underwater explosions.

Another object of this invention is to disclose a velocity meter which will have an infinite stroke and thereby will not bottom even though the input displacement may be several inches.

Other objects and advantages of the invention will hereinafter become more fully apparent from the following description of the annexed drawings, which illustrate a preferred embodiment, and wherein.

Figure 10:
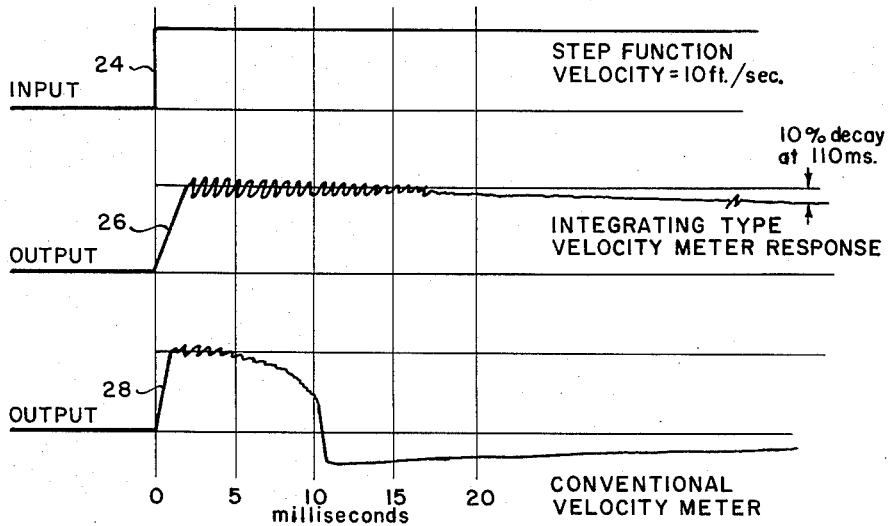
Figure 8:
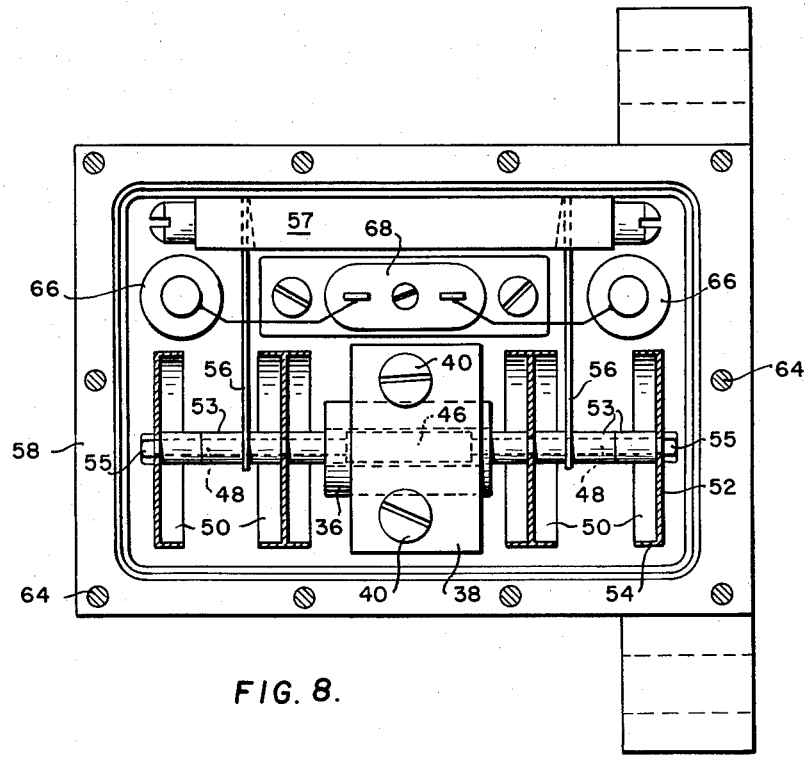
Figure 9:
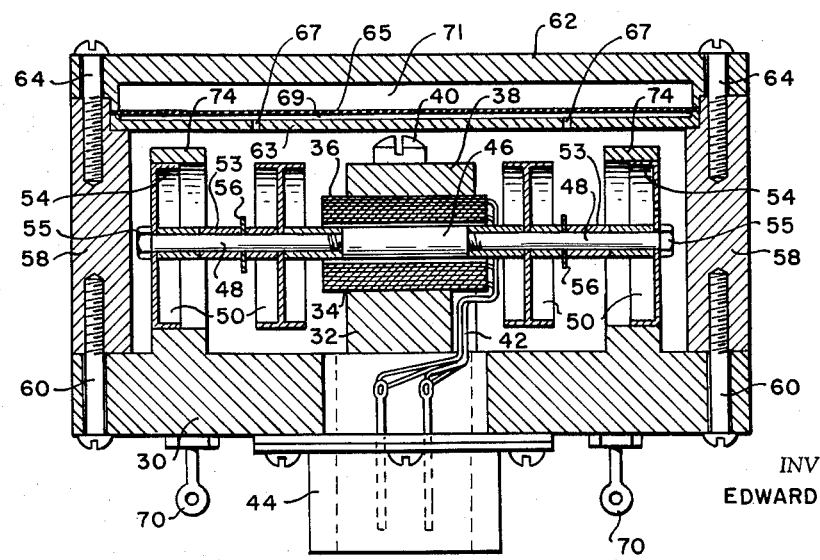

FIG. 8 discloses a viscosity controlled velocity meter in accordance with the invention;

FIG. 9 discloses a viscosity controlled velocity meter with additional damping cylinders; and FIG. 10 is a graph of the response of the viscosity controlled velocity meter as compared with an ordinary velocity meter to a step function input.

Figure 1:
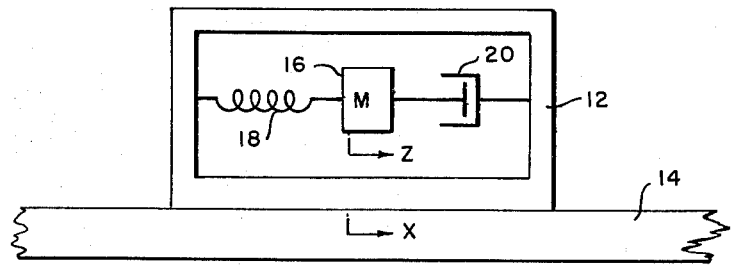
FIG. 1 shows a seismic type pick-up for measuring linear motion.

FIGURE 1 represents a simple seismic system. Let $x$ be the absolute displacement of the frame 12 of the pickup (which is rigidly attached to the body 14 whose motion is to be measured) and let Z be the absolute displacement of the seismic mass ($m$) 16. The relative deflection ($y$) of the mass 16 with respect to the frame 12 is then (1) $$y = Z - x$$

The output signal of the pickup is usually proportional to $y$ or to its time derivative $\dot{y}$. The spring force of spring 18 per unit of $y$ elongation is denoted by $k$. The damping force per unit of relative velocity is $c$ and in the figure is represented by a dashpot 20.

The equation of $y$ motion is then (2) $$m\ddot{Z} = -c\dot{y} - ky$$

This may be rewritten as (2a) $$\ddot{y} + \frac{c\dot{y}}{m} + \frac{ky}{m} = \ddot{x}$$

or as (2b) $$\ddot{y} + 2hp\dot{y} + p^2 y = \ddot{x}$$

where $$p_2 = \frac{k}{m} \text{ and } h = c/C_c$$

$C_c$ is the viscosity force per unit velocity which produces critical damping; it equals $2\sqrt{km}$. So $$\frac{c}{m} = \frac{c}{C_c} \cdot \frac{C_c}{m} = h \frac{2\sqrt{km}}{m} = 2hp$$

From Equation 2, the response of seismic type pickups for various inputs may be determined. The steady state response for the pickup whose output is proportional to the relative displacement of the system mass is reviewed here for a harmonic motion input of constant amplitude; the complete response (i.e. transient plus steady state response) for a step-velocity input is also reviewed.

For the pickup whose output is proportional to the relative velocity of the system mass, the steady state response is reviewed for an input which is a harmonic velocity of constant amplitude; the complete response for a step-velocity input is also determined.

The three usual types of harmonic motion are:

(3a) $\ddot{x} = \ddot{x}_0 \cos wt$ (3b) $\ddot{x} = -\dot{x}_0 w \sin wt$ (3c) $\ddot{x} = -x_0 w^2 \cos wt$ Where $W = 2\pi f$ and $f =$ the frequency of vibration. Note that the input in 3a is a harmonic acceleration of constant amplitude ($\ddot{x} = \ddot{x}_0 \cos wt$); in 3b, the input is a harmonic velocity of constant amplitude $$(\dot{x} = \dot{x}_0 \cos wt)$$

and in 3c, a harmonic displacement of constant amplitude ($x = x_0 \cos wt$).

The steady state solution for Equation 3 is given, for example in Advanced Engineering Mathematics by C. R. Wylie, Jr., McGraw-Hill, 1951, pages 69–86.

Figure 2:
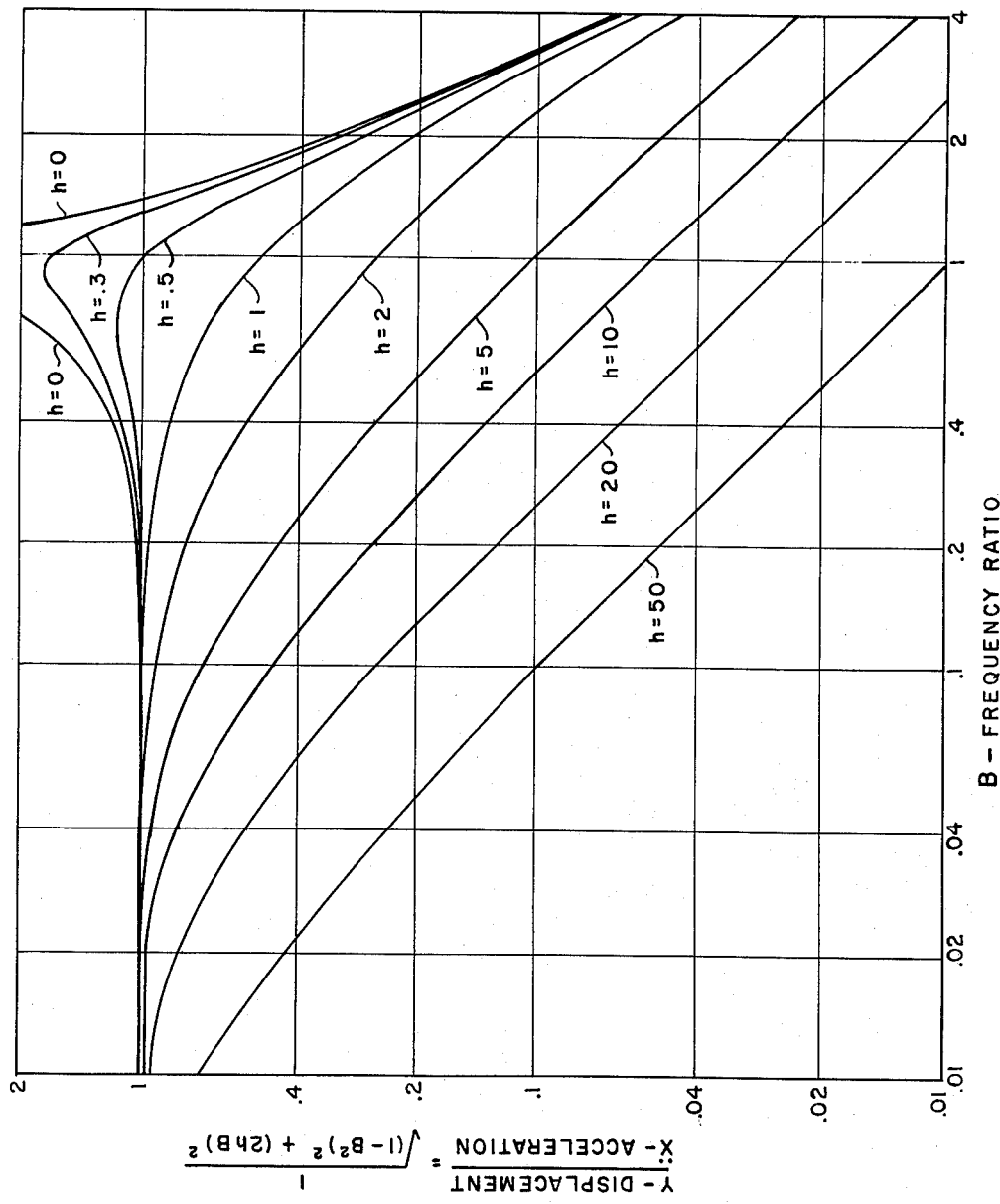
FIG. 2 is a graph of the response of a seismic displacement pickup to a harmonic acceleration.
Figure 3:
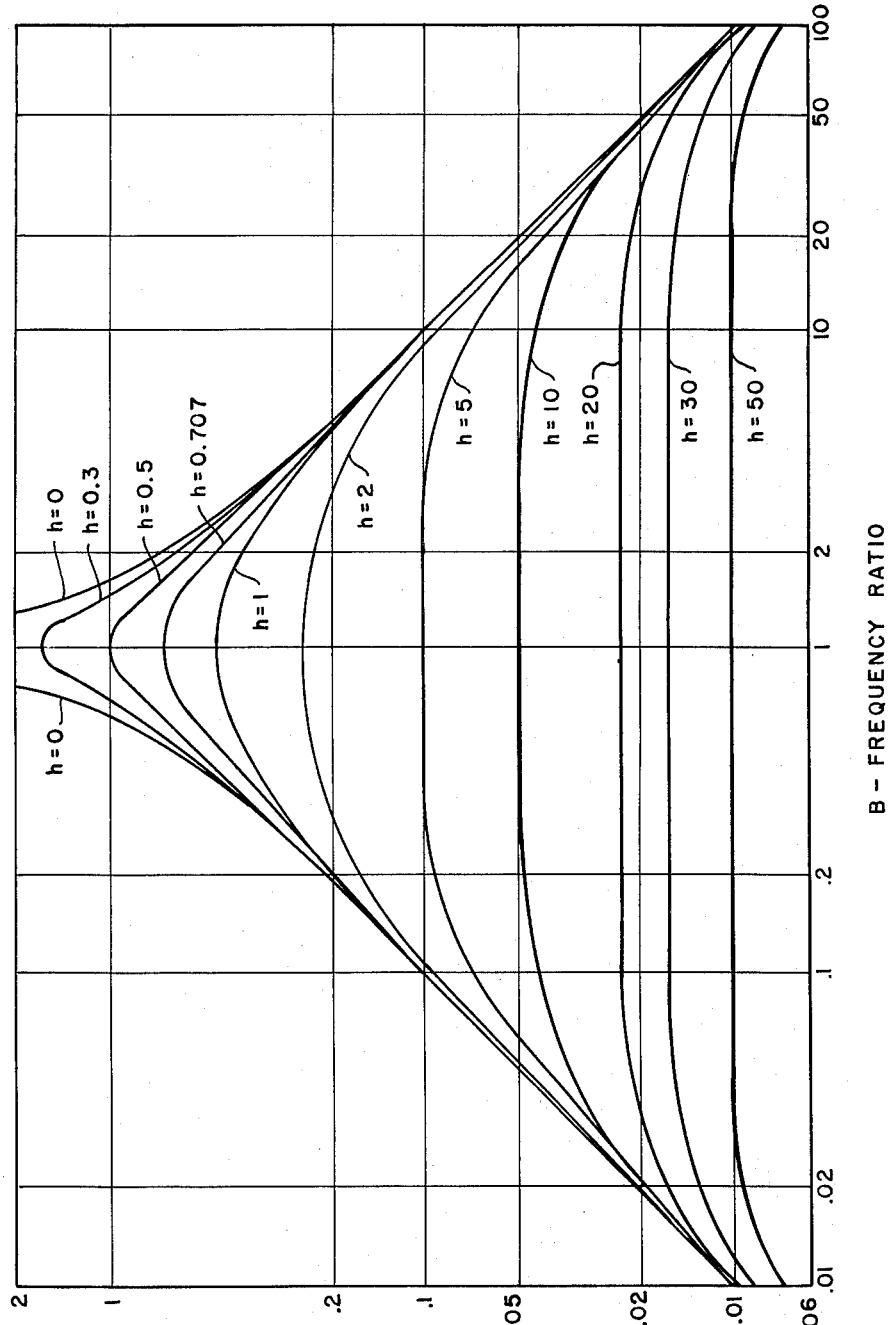
FIG. 3 is a graph of the response of a seismic displacement pickup to a harmonic velocity.
Figure 4:
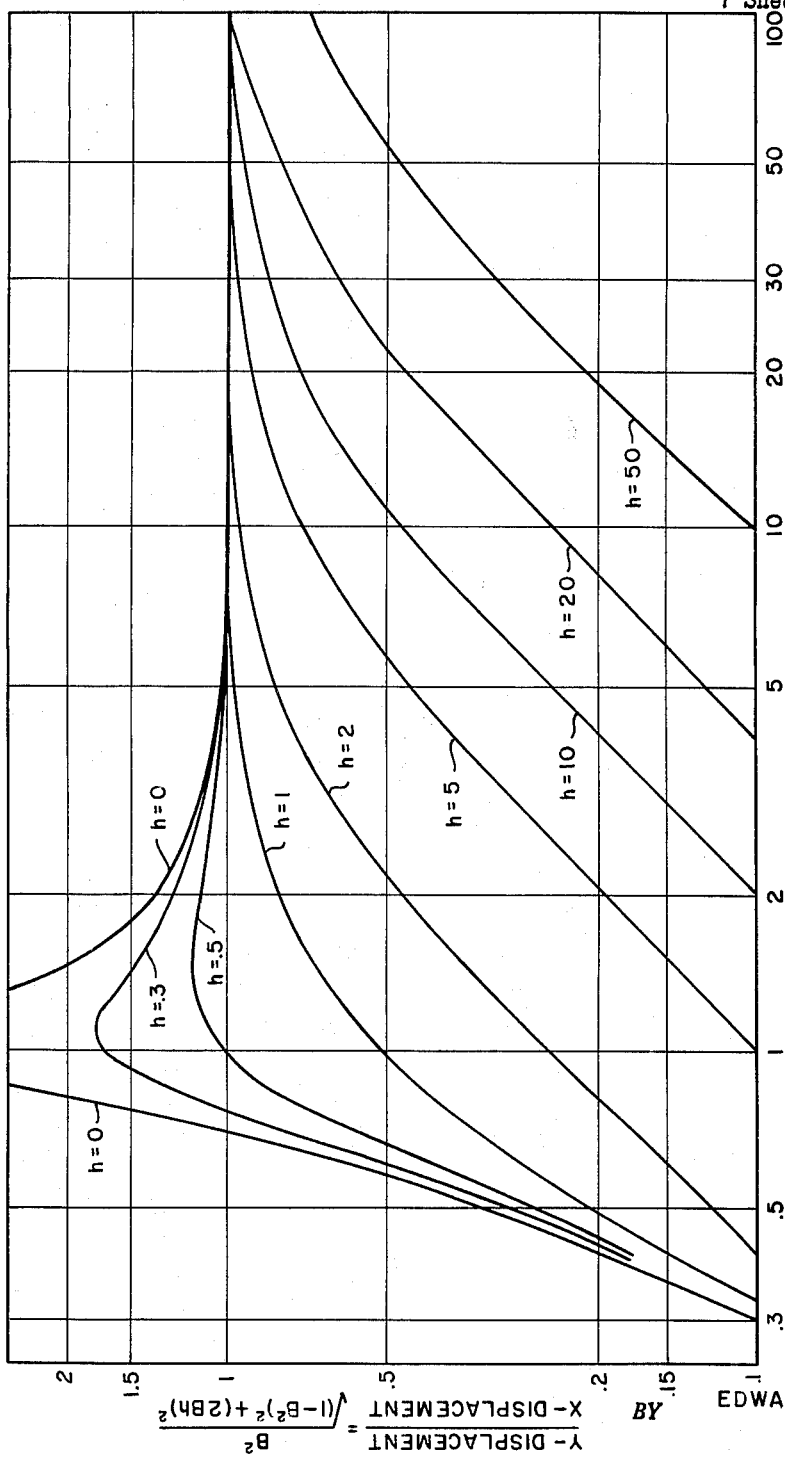
FIG. 4 is a graph of the response of seismic displacement pickup to a harmonic displacement.
Figure 5:
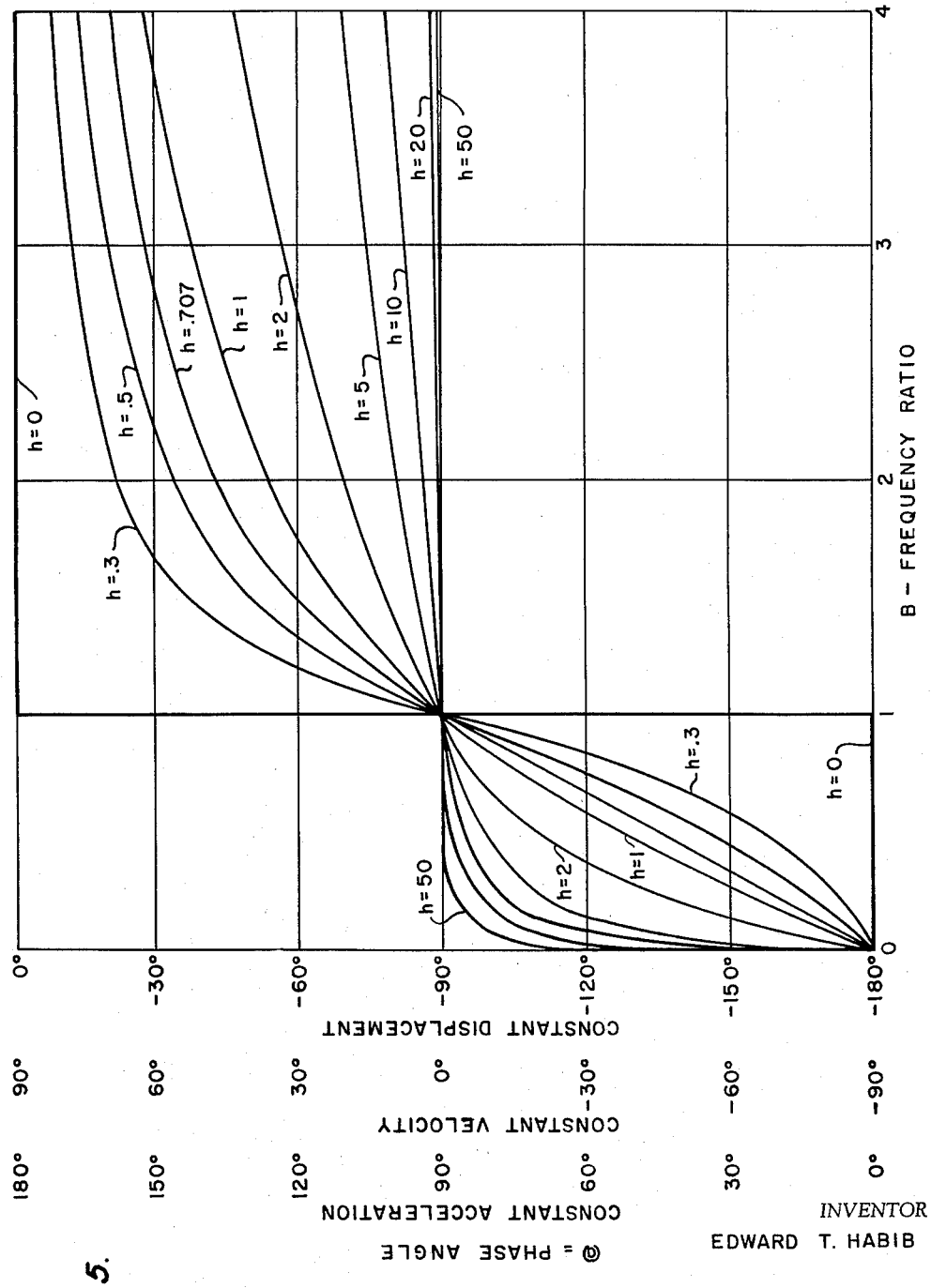
FIG. 5 is a graph of the phase angle response of a seismic displacement pickup.

Letting $$B = \frac{w}{p},$$

the steady state solutions for Equations 3a, 3b, and 3c respectively are:

(4a) $\dfrac{y}{\ddot{x}_0/p^2} = \dfrac{1}{\sqrt{(1-B^2)^2 + (2hB)^2}} \cos(wt - @)$ (4b) $\dfrac{y}{\dot{x}_0/p} = \dfrac{B}{\sqrt{(1-B^2)^2 + (2hB)^2}} \cos(wt - @)$ (4c) $\dfrac{y}{x_0} = \dfrac{B^2}{\sqrt{(1-B^2)^2 + (2hB)^2}} \cos(wt - @)$ The phase angle @ is given by (4d) $@ = \arctan \dfrac{2Bh}{1 - B^2}$ In FIGURE 2, the quantity $$\left| \frac{1}{\sqrt{(1-B^2)^2 + (2hB)^2}} \right|$$

is plotted as a function of B for several values of $h$;

In FIG. 3, $$\left| \frac{B}{\sqrt{(1-B^2)^2 + (2hB)^2}} \right|$$

is plotted;

In FIG. 4, $$\left| \frac{B^2}{\sqrt{(1-B^2)^2 + (2hB)^2}} \right|$$

is plotted; and in FIG. 5, arc tan $$\frac{2Bh}{1-B^2}$$

is plotted. All are plotted as a function of B for several values of $h$.

From FIGS. 2, 3 and 4 it may be noted that the seismic pickup, whose output is proportional to the relative deflection of the mass, is an accelerometer for $B \ll 1$ (FIG. 2), a velocity meter for $B \approx 1$ (FIG. 3) and a displacement meter for $B \gg 1$ (FIGURE 4). The amount of damping, $h$, determines the range of frequencies over which the response is linear.

In FIGURE 5, we note that there is no phase distortion (i.e. @ is a constant or is a linear function of B) for $h$ equal to zero or $1/\sqrt{2}$ when B is less than 1; when B is greater than 1, there is no phase distortion when $h$ is equal to zero. For $h \gg 1$, the phase distortion is small over a large range of B.

From FIGS. 3 and 5, it may be noted that the pickup shown in FIG. 1 has a flat frequency response curve and that the phase angle variation is linear over a large range of B when the damping, $h$, is large. In fact response is flat within 10%, over the range $$\frac{B}{h}$$

to $hB$; e.g. if $h = 20$, and $fn = 30$, over the range 1.5 to 600 c.p.s. Where $$fn = \frac{1}{2\pi \sqrt{\frac{k}{m}}}$$

In short, by highly overdamping an accelerometer, a velocity meter is obtained. It may also be noted that in a similar fashion overdamping an ordinary velocity meter produces a displacement gage.

In passing, it may be noted from FIG. 3, that if the response to a velocity input (steady state) is plotted for an accelerometer, the natural undamped frequency is easily apparent as a resonance and the percent damping may be picked off as a function of the flat range.

This steady state response is of interest; but in shock work, the transient response is much more important. Although the transient response to any input may be analytically computed from the steady state response, it is easier to compute the transient response to a specific input by going back to the equation of motion.

The transient response to a step velocity is probably the most interesting case and it is also easy to compute.

The equation of motion with step velocity input is:

(5) $\ddot{y} + 2hp\dot{y} + p^2 y = \ddot{x}$

Initial condition $t = 0 \quad x = 0$ $\dot{x} = \dot{x}_0$

Figure 6:
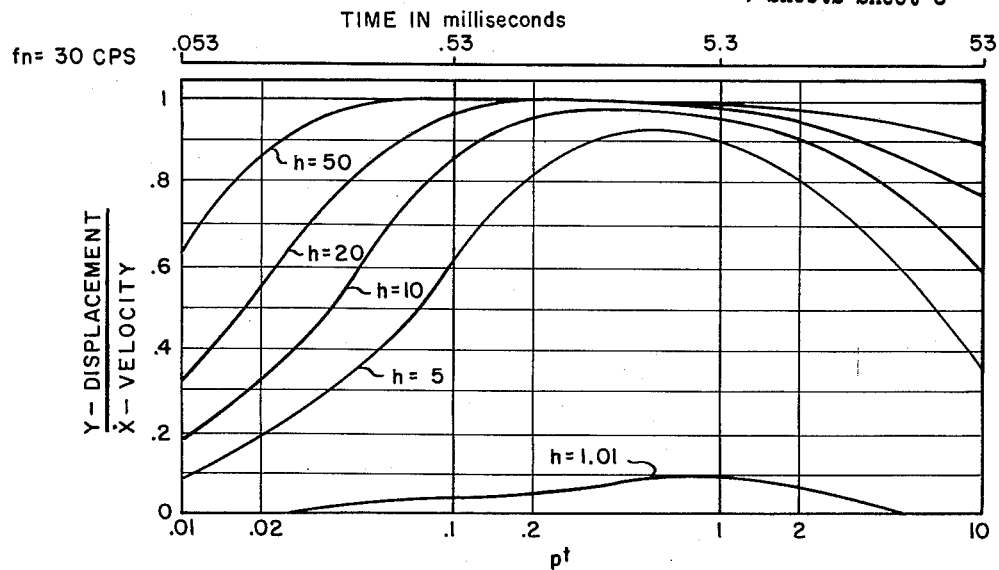
FIG. 6 is a graph of the response of a seismic displacement pickup to a step function velocity.

The solution of Equation 5 is (5a) $y = \dfrac{\dot{x}_0}{p\sqrt{1-h^2}} (e^{-hpt}) \sin(pt\sqrt{1-h^2})$ If $h > 1$, this reduces to (5b) $y = \dfrac{\dot{x}_0}{p\sqrt{h^2-1}} (e^{-hpt}) \sinh(pt\sqrt{h^2-1})$ In FIG. 6, $$\left| \frac{y}{\dot{x}_0/p\sqrt{h^2-1}} \right| = e^{-hpt} \sinh(pt\sqrt{h^2-1})$$

is plotted as a function of $pt$ for various $h$, where $h$ is greater than 1. An additional abscissa scale for a pickup with a natural frequency of 30 c.p.s. is shown.

If the output of the seismic pickup is proportional to relative velocity (rather than relative displacement) then the quantity $\dot{y}$ is the parameter of interest. This is the case for the usual electromagnetic velocity meter. The solution of Equation 3b, i.e., with input motion a harmonic velocity of constant amplitude ($-\dot{x} = \dot{x}_0 \sin wt$), is given by equation (4b) $\dfrac{y}{\dot{x}_0/p} = \dfrac{B}{\sqrt{(1-B^2)^2 + (2hB)^2}} \cos(wt - @)$ Differentiating (4e) $\dfrac{\dot{y}}{\dot{x}_0} = \dfrac{B^2}{\sqrt{(1-B^2)^2 + (2hB)^2}} \sin(wt - @)$ The quantity $$\left| \frac{B^2}{\sqrt{(1-B^2) + (2hB)^2}} \right|$$

has already been plotted in FIG. 4 and the phase angle has been plotted in FIG. 5. Since the output signal is constant and the phase angle variation with frequency is linear for $B \gg 1$, then the pickup is a velocity meter over this range of B.

The transient response of this type of pickup is obtained by taking the derivative of Equation 5a, thus obtaining:

(6)
$$\dot{y} = \dot{x}_0 e^{-hpt}\left[\frac{-h}{\sqrt{1-h^2}}\sin(pt\sqrt{1-h^2}) + \cos(pt\sqrt{1-h^2})\right]$$

$$\frac{\dot{y}}{\dot{x}_0} = \frac{e^{-hpt}}{\sqrt{1-h^2}}\cos(pt\sqrt{1-h^2} + @)$$

where $@ = \arcsin h$.

Figure 7:
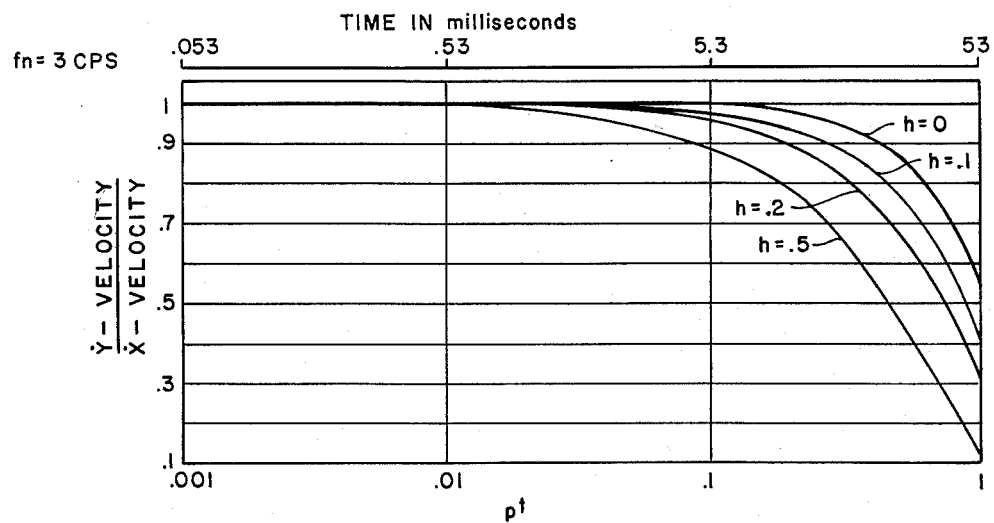
FIG. 7 is a graph of the velocity response of a velocity sensitive pickup to a step function velocity.

In FIG. 7, $$[\dot{y}/\dot{x}_0]$$

is plotted as a function of $pt$ for various "$h$."

From FIG. 7, it may be noted that the effect of damping an electromagnetic type meter is always decrease the accuracy with which the meter measures the first pulse of a transient motion. This may also be seen in the following way:

The equation of motion is (1) $\qquad \ddot{y} + 2ph\dot{y} + p^2 y = \ddot{x}$

Integrate once, then $$\dot{y} + 2ph\int y\,dt + p^2\int y\,dt = \dot{x}$$

Now $\dot{x}$ is the velocity which we are trying to measure; $\dot{y}$ is the relative velocity and the output signal of the meter is proportional to $\dot{y}$. Therefore we want $\dot{y}$ to equal $\dot{x}$. For the initial pulse, i.e., at least as long as $\dot{y}$ is positive, both $\int \dot{y}\,dt$ and $\int y\,dt$ are positive. Since the error of the meter is the algebraic sum of the two, the error is greater so long as both $\dot{y}$ and $y$ are positive.

If later, the velocity $\dot{y}$ becomes negative, then $\int \dot{y}\,dt$ and $\int y\,dt$ may be of opposite sign and the errors may cancel. However, for the initial pulse, the effect of damping is such as to always increase the error.

We note that this is one instance where the steady-state response is apparently improved (i.e., the uniform response range is extended) by the addition of damping but the transient response is adversely affected.

The response of these two types of meters is shown graphically in FIG. 10 where a step function velocity 24 may be applied to both meters. The response curve 26 of the viscosity controlled velocity meter is shown compared with the response curve 28 of an ordinary lightly damped velocity meter. The output of this viscosity controlled velocity meter, as shown by curve 26, follows the input curve 24 very closely for all ranges of the input function. A very small error begins to be introduced after a very long time. In contrast the curve 28 for an ordinary lightly damped velocity meter rises sharply to approximate the input function 24 and then drops off rather poorly. After a short period of time the velocity meter may bottom, at which time it will be thrown back to the other end of its travel, as is shown by the reversal of the curve 28 after which it will gradually drop off to zero.

A particular embodiment of the invention is shown in FIGS. 8 and 9 which comprises a base plate 30, which is adapted to be fastened to a vibrating object such as a ship hull. Rising from the center of the base 30 is a support 32 having a semicircular cutout section 34 for mounting a linear differential transformer 36. A clamping plate 38 holds the differential transformer 36 and is itself fastened by two screws 40.

This transformer 36, a Schaevitz Engineering standard linear voltage differential transformer No. 040MS—L, consists of a primary winding and a pair of secondary windings connected in series opposition which are wound coaxially around a central axis. The leads 42 to the transformer 36 are brought out by a connector 44 through the base 30. The primary leads are connected to a suitable alternating current source and the secondary leads are connected to a rectifying circuit and recording circuit (not shown).

Mounted in the central axis of the transformer 36 is a longitudinal magnetic core 46. Attached to each end of the core 46 are two damping rods 48. Attached to the outer portions of the damping rods 48 are a plurality of damping vanes 50. These vanes 50 comprise a circular sheet 52 having a hole in the center for mounting transversely to the rod 48. Attached to the outer edge of the circular sheet 52 is a cylindrical tube 54 having a central axis coaxial with the damping rod 48. The damping vanes 50 are spaced on the rods 48 by means of a plurality of sleeves 53 and firmly held by nuts 55 mounted on the ends of the rods 48. This construction provides a maximum vane area for a given size and forces the viscous fluid to travel a maximum distance. The damping mechanism 48 thru 54 is preferably made of non-magnetic material such as non-magnetic stainless steel, brass or aluminum. A pair of leaf type springs 56 are fastened centrally of the damping rods 48 and from there are fastened to a clamping mechanism 57, which is attached to the base 30. These leaf springs 56 provide a minimum amount of restraining force on the damping mechanism and the magnetic core 46, being made of .003 inch thick tempered beryllium-copper, and insure that the core 46 will normally be at the center of the differential transformer 36. A rectangular cover member 58 is shown which is fastened to the base 30 by screws 60. A rectangular cover plate 62 is shown fastened to the rectangular cover member 58 by screws 64.

After the above described mechanism has, in FIG. 8, been almost completely assembled with the rectangular cover member 58 firmly attached to the base 30, the mechanism is filled with a high viscosity oil such as a silicone oil of the Dow Corning 200 type, 6000 centistokes grade. This high viscosity oil in conjunction with the damping mechanism 48 thru 54 provides the required amount of damping which is used in the mechanism to provide a damping factor of about 30. An inner cover plate 63 having four .0135 inch diameter holes 67 is placed at the top of cover member 58 to confine the oil within the meter. A rectangular flap 65 made of $\frac{1}{32}$ inch thick neoprene rubber is placed over the top of the inner cover plate 63 and firmly held at the edges by cover plate 62. This flap 65 is flexible and thereby allows the volume of the enclosed oil which flows through holes 67 to change slightly, such as is necessary with temperature changes. An oil reservoir 69 is provided between inner cover plate 63 and rubber flap 65 to provide an excess of oil which may be necessary if the meter is used or exposed to a lower than usual temperature.

An air space 71 is shown between rubber flap 65 and cover plate 62 to allow for expansion of the oil and the flap 65. A hole 73 is provided in plate 62 to equalize the pressure between air space 71 and the outside.

Since the viscosity of the oil changes with the temperature, a temperature regulating mechanism is shown comprising heater units 66 which are operated by a thermostatic switch 68. Suitable connecting leads are brought out to the terminals 70 for attachment to a power supply (not shown). In actual operation the thermostatic switch is adjusted so that the heater will maintain the velocity meter at a temperature of about 110° F. Thus the velocity meter may be calibrated and the damping factor adjusted by adjusting the number of vanes or their area or the viscosity of the oil to fit the application which it is designed for.

If more damping is required a suitable mechanism is shown in FIG. 9 where a pair of damping cylinders 74 are shown attached to the base 30. These damping cylinders 74 fit over the cylindrical tubes 54 with a sliding fit which does not allow an appreciable amount of oil to pass between the tubes 54 and the cylinders 74. The oil is then forced to pass completely around the damping cylinders which provides a longer path and thereby more damping. The velocity meter shown in FIG. 9 will use an oil having a viscosity of 3600 centistokes to achieve the same damping factor as the meter shown in FIG. 8.

The velocity meter as shown in FIG. 8 has a resonant frequency in the order of 30 cycles per second. A damping factor in the neighborhood of 30 has been shown to have a number of advantages, for example, a meter may have a resonant frequency of 30 c.p.s. and a damping of 30 times critical. The moving element has a stroke of + or − 1/16 inch. The range of the meter is + or − 30 ft. per second. For input velocities within the range of 30 ft. per second the meter does not bottom even though the input displacement may be several inches. Thus, a step velocity input of 30 ft. per second implies an input displacement of 12 inches after 33 milliseconds. This does not bottom the viscosity controlled velocity meter whereas an ordinary velocity meter would bottom after 2 inches or less of displacement. The velocity meter is insensitive to transverse motions since the transformer or other suitable device will respond only to longitudinal variations of the core and damping rods.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

What is claimed is:

A viscosity controlled velocity meter comprising a base adapted to be fastened to a vibrating object; a linear voltage differential transformer comprising a primary winding and a pair of secondary windings connected in series opposition, said windings being wound coaxially around a central axis, and a cylindrical magnetic core slidably mounted within said windings along said central axis; a support mounted on said base having an opening whereby said differential transformer is mounted with its central axis parallel to said base; a pair of damping vane rods each attached by one end to the opposite ends of said magnetic core and having the other end extending away from said core along said central axis; a pair of leaf type restraining springs each attached by one end to the central section of one of said damping vane rods and by the other end to said base whereby a minimum spring force will be exerted on said rods; a plurality of damping vanes connected to said rods each comprising a circular sheet having a central hole for mounting said sheets on said rods transversely to the axis of said rods and a cylindrical tube having its inner circumference attached to the outer edge of said circular sheet with the central axis of said tube coincident with said rods; a pair of damping cylinders each mounted near the outer end of said rods to said base in sliding engagement with one of said damping vanes; a cover mounted on said base completely enclosing said transformer, rods, and vanes whereby an airtight seal is provided; means for connecting said transformer to a power supply and recording means; a constant temperature device mounted on said base comprising a heating element and a thermostatically controlled switch adapted to be driven by a separate power source operable to keep the temperature of said meter relatively constant; and a high viscosity oil placed within said cover and in contact with said vanes and said heating element whereby a large damping factor between 5 and 50 may be obtained to render said meter linearly responsive to the velocity of vibration over a large range of frequencies of vibration.

References Cited in the file of this patent

UNITED STATES PATENTS

| | | |
|---|---|---|
| 2,359,245 | Ritzmann | Sept. 26, 1944 |
| 2,570,672 | Hathaway | Oct. 9, 1951 |
| 2,737,624 | Muller | Mar. 6, 1956 |
| 2,759,157 | Wiancko | Aug. 14, 1956 |
| 2,778,905 | Statham | Jan. 22, 1957 |

FOREIGN PATENTS

| | | |
|---|---|---|
| 131,184 | Great Britain | Aug. 21, 1919 |
| 293,461 | Switzerland | Dec. 16, 1953 |